(12) United States Patent
Morikawa et al.

(10) Patent No.: US 10,627,493 B2
(45) Date of Patent: Apr. 21, 2020

(54) APPARATUS, METHOD FOR LASER DISTANCE MEASUREMENT, AND NON-TRANSITORY COMPUTER-READABLE STORAGE MEDIUM

(71) Applicant: FUJITSU LIMITED, Kawasaki-shi, Kanagawa (JP)

(72) Inventors: Takeshi Morikawa, Yokohama (JP); Koichi Tezuka, Kobe (JP); Koichi Iida, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 668 days.

(21) Appl. No.: 15/357,248

(22) Filed: Nov. 21, 2016

(65) Prior Publication Data

US 2017/0199273 A1    Jul. 13, 2017

(30) Foreign Application Priority Data

Jan. 8, 2016    (JP) .................................. 2016-002291

(51) Int. Cl.
*G01C 3/08*    (2006.01)
*G01S 7/486*    (2020.01)
(Continued)

(52) U.S. Cl.
CPC .......... *G01S 7/4868* (2013.01); *G01S 7/4816* (2013.01); *G01S 7/497* (2013.01); *G01S 17/42* (2013.01); *G01S 17/48* (2013.01)

(58) Field of Classification Search
CPC ...... G01S 7/4868; G01S 7/4816; G01S 17/42; G01S 17/48; G01S 7/497
See application file for complete search history.

(56) References Cited

U.S. PATENT DOCUMENTS 5,760,886 A    6/1998 Miyazaki et al.
6,301,003 B1    10/2001 Shirai et al.
(Continued)

FOREIGN PATENT DOCUMENTS

JP    4-302283 A    10/1992
JP    6-20079    1/1994
(Continued)

OTHER PUBLICATIONS

Japanese Office Action dated May 7, 2019 for corresponding Japanese Patent Application No. 2015-200783, with English Translation, 8 pages.

(Continued)

*Primary Examiner* — Samantha K Abraham
(74) *Attorney, Agent, or Firm* — Fujitsu Patent Center

(57) ABSTRACT

An apparatus for laser distance measurement includes: a light-projecting circuit for projecting laser light emitted from a laser diode; a filter for transmitting a specific wavelength and suppressing a wavelength other than the specific wavelength; a photodetector including a plurality of photodetector elements, and configured to receive the laser light projected from the light-projecting circuit and reflected from a measurement object through the filter; and a controller for controlling a relative incidence angle of the reflected laser light with respect to the filter, wherein the controller causes a photodetector signal, which is to be used for calculating a distance to the measurement object, to be outputted from a photodetector element of the photodetector at a position to which a shift of a light-condensing position of the reflected laser light occurs as a result of the control of the relative incidence angle from the light-condensing position before the control.

15 Claims, 15 Drawing Sheets

US 10,627,493 B2
Page 2

(51) Int. Cl.
  *G01S 17/42* (2006.01)
  *G01S 7/481* (2006.01)
  *G01S 7/497* (2006.01)
  *G01S 17/48* (2006.01)

(56) References Cited

U.S. PATENT DOCUMENTS

| | | | |
|---|---|---|---|
| 6,459,484 | B1 | 10/2002 | Yokoi |
| 7,304,798 | B2 | 12/2007 | Izumi et al. |
| 8,451,432 | B2 | 5/2013 | Crawford et al. |
| 2002/0027665 | A1 | 3/2002 | Abe et al. |
| 2002/0196424 | A1* | 12/2002 | Sano ................ G01C 3/08 356/4.01 |
| 2003/0090647 | A1 | 5/2003 | Isogai et al. |
| 2005/0110999 | A1 | 5/2005 | Erdogan et al. |
| 2005/0206873 | A1 | 9/2005 | Tanaka et al. |
| 2006/0012785 | A1 | 1/2006 | Funk et al. |
| 2010/0277748 | A1 | 11/2010 | Potapenko |
| 2011/0019188 | A1 | 1/2011 | Ray et al. |
| 2011/0222064 | A1 | 9/2011 | Umeda et al. |
| 2013/0070239 | A1 | 3/2013 | Crawford et al. |
| 2013/0077176 | A1 | 3/2013 | Ohtomo et al. |
| 2014/0125981 | A1 | 5/2014 | Iga et al. |
| 2015/0015756 | A1 | 1/2015 | Suzuki |
| 2018/0081045 | A1* | 3/2018 | Gylys ................ G01S 17/08 |

FOREIGN PATENT DOCUMENTS

| | | | |
|---|---|---|---|
| JP | 7-63512 A | 3/1995 | |
| JP | 2000-56018 A | 2/2000 | |
| JP | 2001-66495 A | 3/2001 | |
| JP | 2002-287082 | 10/2002 | |
| JP | 2004-110293 | 4/2004 | |
| JP | 2004-157044 A | 6/2004 | |
| JP | 2005-265606 A | 9/2005 | |
| JP | 2007-085832 | 4/2007 | |
| JP | 2010-122183 A | 6/2010 | |
| JP | 2011-89874 A | 5/2011 | |
| JP | 2011-158589 | 8/2011 | |
| JP | 2013-072771 | 4/2013 | |
| JP | 2014-59301 A | 4/2014 | |
| JP | 2014-095594 | 5/2014 | |

OTHER PUBLICATIONS

U.S. Office Action dated Feb. 13, 2019 for copending U.S. Appl. No. 15/287,279, 11 pages.
Notice of Allowance dated Sep. 4, 2019 for copending U.S. Appl. No. 15/287,279, 4 pages.
Notice of Allowance dated Jul. 22, 2019 for copending U.S. Appl. No. 15/287,279, 4 pages.
Notice of Allowance dated Jul. 22, 2019 for copending U.S. Appl. No. 15/287,279, 7 pages.
Japanese Office Action dated Oct. 1, 2019 for corresponding Japanese Patent Application No. 2016-002291 with English Translation, 7 pages.
Japanese Office Action dated Feb. 12, 2020 for corresponding Japanese Patent Application No. 2016-002291, with English Translation, 7 pages.

* cited by examiner

| VERTICAL ANGLE V | HORIZONTAL ANGLE H | PHOTODETECTOR CHANNEL [D(11),···,D(m1),D(12),···,D(m2),···,D(1n),···,D(mn)] |
|---|---|---|
| 10 | 10 | (1,1,1,1,0,0,0,..............,0,0,0) |
|  | ... | ... |
|  | -10 | (0,0,0,...,1,1,1,1,0,0,..............,0,0,0) |
| ⋮ | ⋮ | ⋮ |
| -10 | 10 | (0,0,0,...,1,1,1,1,0,0,..............,0,0,0) |
|  | ... | ... |
|  | -10 | (0,0,0,..............,0,0,0,1,1,1,1) |

US 10,627,493 B2

APPARATUS, METHOD FOR LASER DISTANCE MEASUREMENT, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-002291, filed on Jan. 8, 2016, the entire contents of which are incorporated herein by reference.

FIELD

The embodiments discussed herein are related to an apparatus, a method for laser distance measurement, and a non-transitory computer-readable storage medium.

BACKGROUND

A laser distance measurement apparatus, which may also be called a laser radar, is used for measuring a distance to a measurement object, for example. The laser distance measurement apparatus scans a scanning range including the measurement object by laser light emitted from a laser diode or the like. Based on a photodetector signal outputted from a photodetector that receives the laser light reflected from the measurement object, the laser distance measurement apparatus measures the distance to the measurement object based on the time from the emission to reception of the laser light. The laser distance measurement apparatus is also used for purposes such as obstacle detection for driving support or parking support for a vehicle and peripheral monitoring for detecting a person between doors for automatic platform gates and vehicles at a railroad platform, for example.

The photodetector of the laser distance measurement apparatus receives light with a comparatively wide wavelength band. This causes the laser distance measurement apparatus to also detect other wavelength bands outside the wavelength of the laser light emitted from the laser diode. Especially when the scanning range of the laser light is widened, the photodetector receives the laser light reflected from the measurement object with a wider angle, and accordingly the photodetector receives much more undesirable light such as ambient light. This increases noise due to an influence of the ambient light and the like and deteriorates the measurement accuracy of the laser distance measurement apparatus. To address this problem, a technique has been proposed to suppress the noise due to the influence of the ambient light and the like by providing a band-pass filter, which allows only a wavelength band at and around the wavelength of the laser light to pass, as a preceding stage of the photodetector.

To suppress the noise due to the influence of the ambient light and the like as much as possible, it is desirable that the center wavelength of a passband of the band-pass filter match a center wavelength of the laser light projected from the laser diode. Matching the passband center wavelength of the band-pass filter with the center wavelength of the laser light projected from the laser diode makes it possible to narrow the passband of the band-pass filter.

However, the wavelength of the laser light projected from the laser diode changes to a longer wavelength side at high temperature and to a shorter wavelength side at low temperature. This temperature-dependent variation of the wavelength of the laser light, which is projected from the laser diode in the laser distance measurement apparatus, is approximately 0.3 nm for every 1° C., for example. Hence, when a temperature range of the environment in which the laser diode is used is from −20° C. to 85° C., for example, it is desired that the center wavelength of the passband of the band-pass filter be adjusted to have a wide passband in some measure (31.5 nm, for example) around the center wavelength of the laser light projected from the laser diode.

As other examples of the related art, Japanese Laid-open Patent Publication Nos. 2004-110293, 2013-72771, 2014-95594, 2007-85832, and 6-20079 are known.

SUMMARY

According to an aspect of the invention, an apparatus for laser distance measurement includes: a light-projecting circuit configured to project laser light emitted from a laser diode; a filter configured to transmit light of a specific wavelength region and suppress light of a wavelength region other than the specific wavelength region; a photodetector including a plurality of photodetector elements, and configured to receive the laser light, which is projected from the light-projecting circuit and reflected from a measurement object, through the filter; and a controller configured to control a relative incidence angle of the reflected laser light with respect to the filter, wherein the controller is configured to cause a photodetector signal, which is to be used for calculating a distance to the measurement object, to be outputted from a photodetector element of the photodetector at a position to which a shift of a light-condensing position of the reflected laser light occurs as a result of the control of the relative incidence angle from the light-condensing position before the control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of a table storing photodetector channels depending on a light-projecting direction;

DESCRIPTION OF EMBODIMENTS

Figure 1:
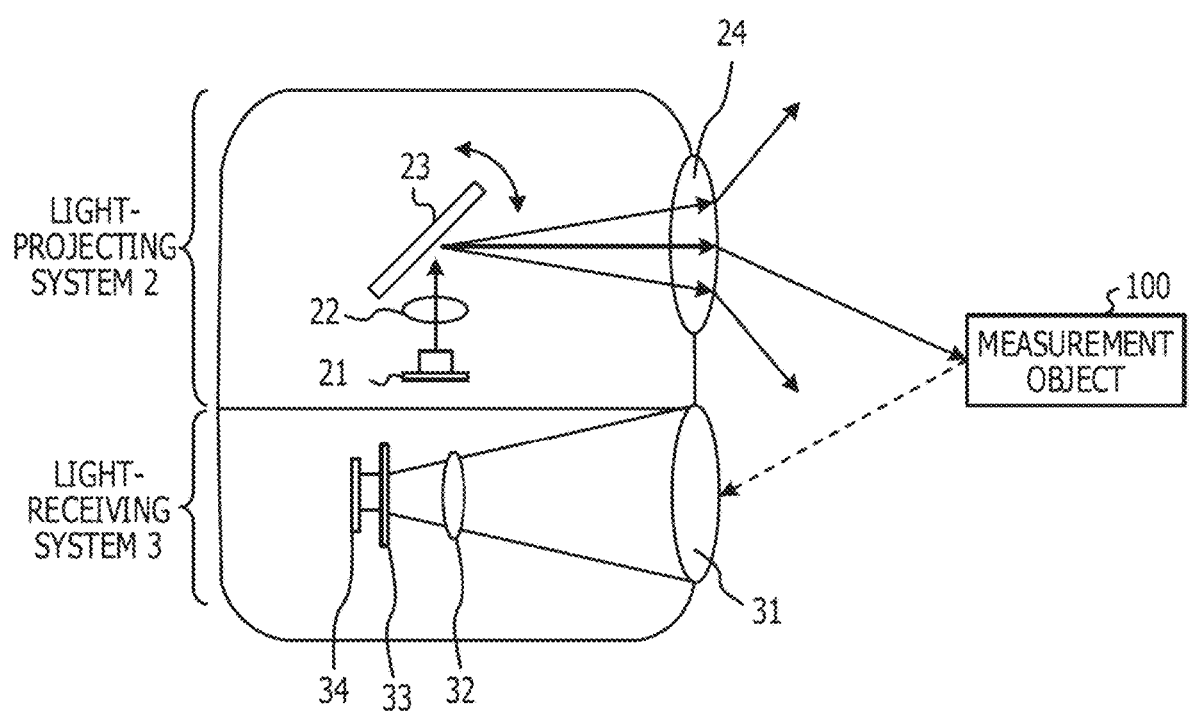
FIG. 1 is a diagram schematically illustrating an example of a laser distance measurement apparatus according to a first embodiment.

A passband center wavelength of a band-pass filter may be adjusted by changing an incidence angle of laser light to the band-pass filter or changing an angle of the band-pass filter with respect to incident laser light (hereinafter, also simply referred to as "relative incidence angle of the laser light to the band-pass filter"). However, such a change of the relative incidence angle of the laser light to the band-pass filter allows shifting of an optical path of the laser light reaching a photodetector through the band-pass filter. As a result, a position on the photodetector on which the laser light is condensed through the band-pass filter shifts from a position before the change of the relative incidence angle. If the laser light is condensed on an area without sensitivity or an area with sensitivity lower than another area on the photodetector because of the change of the relative incidence angle, the amount of light received by the photodetector decreases and thereby a problem such as deterioration of the accuracy of the distance measurement occurs.

In the laser distance measurement apparatus, the passband center wavelength of the band-pass filter may be adjusted by changing the relative incidence angle of the laser light to the band-pass filter according to temperature. However, such a change of the relative incidence angle of the laser light to the band-pass filter allows shifting of the optical path of the laser light reaching the photodetector through the band-pass filter. As a result, the position on the photodetector at which the laser light is condensed through the band-pass filter shifts from the position before the relative incidence angle was changed. Thus, a problem such as the deterioration of the accuracy of the distance measurement may occur depending on the laser light-condensing position.

As one aspect of the present embodiment, provided are solutions for being able to inhibit the accuracy of the distance measurement from deteriorating even when the relative incidence angle of the laser light to the band-pass filter is changed.

The disclosed laser distance measurement apparatus includes a photodetector including multiple photodetector units configured to receive laser light, which is emitted from a laser diode or the like and projected on and reflected from a measurement object, through a filter, and a controller configured to control a relative incidence angle of the reflected laser light to the filter to make an adjustment such that the passband center wavelength of the filter matches a center wavelength of the laser light, which varies with temperature. The controller selectively controls and turns on a photodetector unit of the photodetector at a position to which a shift of a light-condensing position of the reflected laser light occurs as a result of the adjustment from the light-condensing position before the adjustment. A distance to the measurement object may be calculated based on a photodetector signal of the photodetector unit controlled to be turned on.

Embodiments of the disclosed apparatus, method, and program of laser distance measurement are described below with reference to the drawings.

First Embodiment

Figure 2:
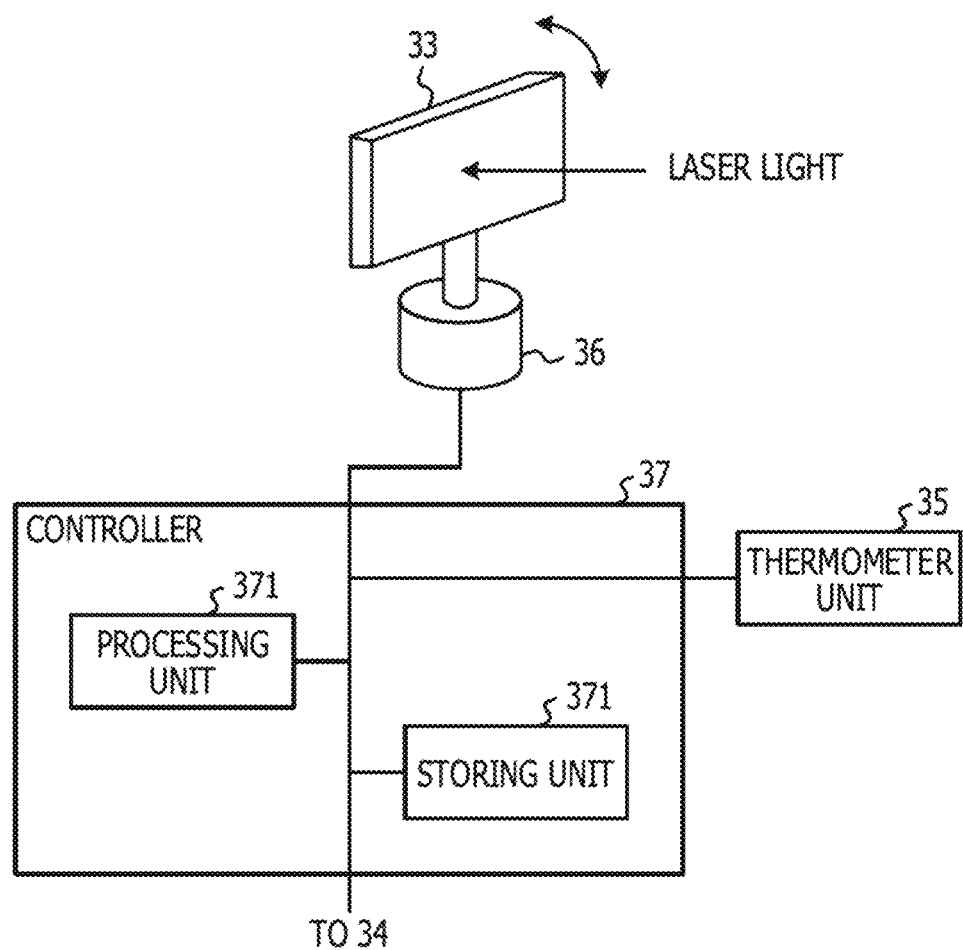
FIG. 2 is a diagram illustrating an example of a control system of a band-pass filter.

FIG. 1 is a diagram schematically illustrating an example of a laser distance measurement apparatus according to a first embodiment, and FIG. 2 is a diagram illustrating an example of a control system of a band-pass filter.

As illustrated in FIG. 1, a laser distance measurement apparatus 1-1 includes a light-projecting system 2 as an example of a light-projecting unit and a light-receiving system 3 as an example of a light-receiving unit. The light-projecting system 2 includes a laser diode 21 as an example of a laser light source, a collimating lens 22, a mirror 23, and a light-projecting lens 24. As indicated by a solid line, laser light emitted from the laser diode 21 is projected on a measurement object 100 through the collimating lens 22, the mirror 23, and the light-projecting lens 24. The mirror 23 is driven, for example, to scan in two dimensions using a publicly known method and thereby allows the laser light to scan a two-dimensional region including the measurement object 100.

Meanwhile, the light-receiving system 3 includes a light-receiving lens 31, a condenser lens 32, a band-pass filter 33 for allowing a specific wavelength band to pass, and a multi-divided photodetector 34. The laser light projected from the light-projecting system 2 is reflected from the measurement object 100 as indicated by a broken line and consequently reaches the light-receiving system 3. The reflected laser light is condensed on the multi-divided photodetector 34 through the light-receiving lens 31, the condenser lens 32, and the band-pass filter 33. The multi-divided photodetector 34 may be formed of a photodiode, for example. A photodetector area (or photodetector surface) of the multi-divided photodetector 34 is divided into multiple photodetector units. Each of the photodetector units may either be formed as a single photodetector or be formed as part of a photodetector area forming a single photodetector. In the former case, the multi-divided photodetector 34 may be formed of a photodetector array with multiple photodetectors arranged in a matrix on the photodetector area (or photodetector surface). The band-pass filter 33 is an example of a filter designed to allow the specific wavelength band to pass. A control system of the band-pass filter 33 is not illustrated in FIG. 1.

As illustrated in FIG. 2, the control system of the band-pass filter 33 includes a thermometer unit 35 that may be formed of a temperature sensor or the like, a motor 36 as an example of a drive unit, and a controller 37. In this example, a stepping motor is used as the motor 36. The controller 37 controls the motor 36 to control an angle at a single axis of the band-pass filter 33 as the center. This makes it possible to change and adjust an incidence angle of the laser light to the band-pass filter 33 or an angle of an incidence plane of the band-pass filter 33 with respect to the incident laser light (in other words, "a relative incidence angle of the laser light to the band-pass filter 33"). Note that a method of adjusting the relative incidence angle of the laser light to the band-pass filter 33 is not limited to the method employed in the present embodiment. The controller 37, in other words, only requests to control the relative incidence angle of the reflected laser light with respect to the band-pass filter 33 to adjust a passband center wavelength of the band-pass filter 33 so that the passband center wavelength of the band-pass filter 33 matches a center wavelength of the laser light, which varies with the temperature. Hence, the control of the relative incidence angle is not limited to the control of orientation of the band-pass filter 33 by the motor 36 and the like, but may be control of an optical path of the laser light incident on the incidence plane of the band-pass filter 33.

The controller 37 may be formed of a computer including a processing unit 371, which may be a processor such as a central processing unit (CPU), and a storing unit 372. The processing unit 371 is capable of measuring a distance between the laser distance measurement apparatus 1-1 and the measurement object 100 by executing a measurement program stored in the storing unit 372, for example. In addition to a program such as the measurement program, the storing unit 372 stores various data such as parameters for computation executed by the processing unit 371, an intermediate result of the computation, and a measurement result. The parameters stored in the storing unit 372 include, for example, the amount of the wavelength variation of the laser diode 21 per unit degrees such as 1° C. The storing unit 372 may be a semiconductor storage, a magnetic recording medium, an optical recording medium, a magneto optical recording medium, or the like, for example. The thermometer unit 35 is provided at a place of the laser distance measurement apparatus 1-1 in which the temperature of the laser diode 21 may be measured.

Figure 3:
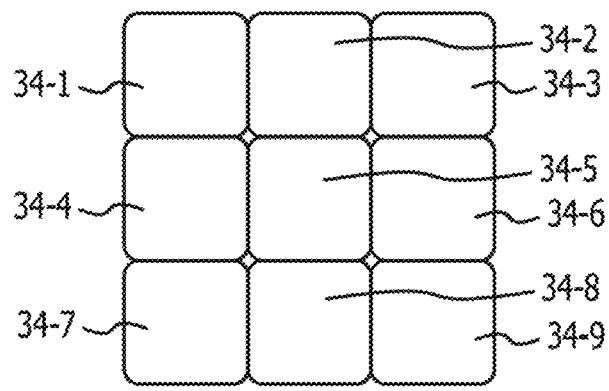
FIG. 3 is a plan view illustrating an example of a multi-divided photodetector.

FIG. 3 is a plan view illustrating an example of the multi-divided photodetector. In this example, the multi-divided photodetector 34 is formed of the nine-divided photodetector, which is divided into nine photodetector units 34-1 to 34-9. However, the number of units the multi-divided photodetector 34 is divided into is not limited to nine and not limited to a specific number as long as it is two or more. In addition, a shape and arrangement of each photodetector unit of the multi-divided photodetector 34 is not specifically limited.

Figure 4:
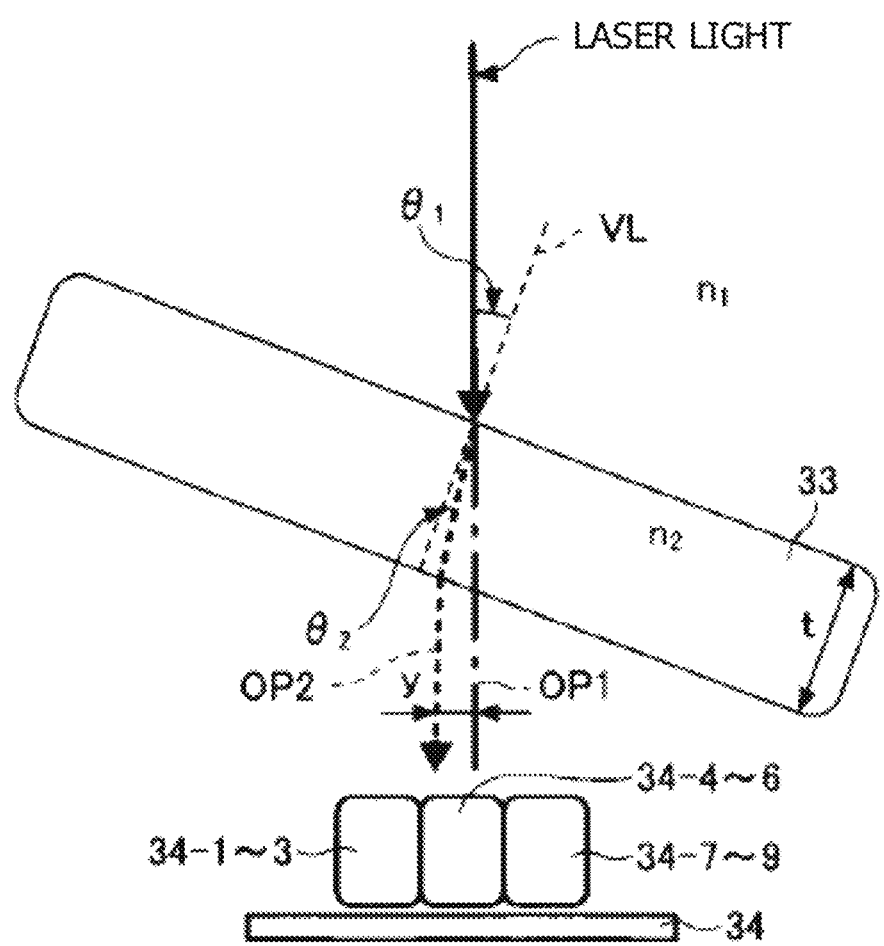
FIG. 4 is a diagram describing an example of adjusting a relative incidence angle of laser light with respect to the band-pass filter.

FIG. 4 is a diagram describing an example of adjusting the relative incidence angle of the laser light to the band-pass filter. For convenience of description, this example indicates the case described hereinafter. Before adjusting the relative incidence angle of the laser light, the laser light is incident perpendicularly on a top surface of the band-pass filter 33, and an incidence angle $\theta_1$ of the laser light to a perpendicular line VL to the incidence plane of the band-pass filter 33 is equal to 0°. After adjusting the relative incidence angle of the laser light as illustrated in FIG. 4, the incidence angle $\theta_1$ is not equal to 0°. In FIG. 4, a bold dotted-dashed line indicates an optical path OP1 of the laser light after passing through the band-pass filter 33 before the adjustment, and a bold broken line indicates an optical path OP2 of the laser light after passing through the band-pass filter 33 after the adjustment. The symbol $n_1$ indicates a refractive index of the air and $n_1=1$, and $n_2$ indicates a refractive index of the band-pass filter 33 (in other words, a refractive index of the material of the band-pass filter 33). In the band-pass filter 33, the above-described incidence angle $\theta_1$ is an angle that the optical path OP1 forms with the perpendicular line VL before the adjustment, and an angle $\theta_2$ is an angle that the optical path OP2 forms with the perpendicular line VL after the adjustment.

The adjustment of the relative incidence angle of the laser light to the band-pass filter 33 matches the passband center wavelength of the band-pass filter 33 with the center wavelength of the laser light emitted from the laser diode 21. This makes it possible to narrow the band of the band-pass filter 33. However, as illustrated in FIG. 4, when the relative incidence angle of the laser light to the band-pass filter 33 is changed, the optical path of the laser light shifts from, for example, the optical path OP1 to the optical path OP2. Hence, the laser light-condensing position on the multi-divided photodetector 34 shifts by an "amount of shift y."

According to Snell's law, the following formulae (1) to (3) are obtained:

$$n_1 \sin \theta_1 = n_2 \sin \theta_2 \qquad \text{formula (1);}$$

$$\sin \theta_2 = (1/n_2)\sin \theta_1 \qquad \text{formula (2);}$$

$$\cos \theta_2 = \{1-(1/n_2)^2 \sin^2\theta_1\}^{1/2} \qquad \text{formula (3).}$$

When the optical path of the laser light shifts from the optical path OP1 to the optical path OP2, the laser light-condensing position on the multi-divided photodetector 34 shifts by the amount of shift y represented by the following formula (4) while t represents the thickness of the band-pass filter 33:

$$y=\cdot\{\sin \theta_1 - \cos \theta_1 (\sin \theta_1 / \cos \theta_2)\} \qquad \text{formula (4).}$$

When a laser distance measurement apparatus has a structure including the separated light-projecting system 2 and light-receiving system 3 as with the laser distance measurement apparatus 1-1 illustrated in FIG. 1, the photodetector 34 receives all the laser light reflected from the scanning range of the laser light. As a result, using a photodetector with a single photodetector unit (or photodetector area) causes the laser distance measurement apparatus to receive noise such as ambient light from all directions. The ambient light may be suppressed by condensing the laser light on a specific photodetector unit 34-$i$ ($i=1$ to 9), which is previously determined from a light-projecting direction of the laser light and an optical system of the light-receiving system 3, of the multi-divided photodetector 34 in FIG. 3. However, when the relative incidence angle of the laser light to the band-pass filter 33 is changed, the optical path of the laser light shifts and thereby the laser light-condensing position also shifts. Thus, it is difficult to condense the laser light on the specific photodetector unit 34-$i$ previously fixed at a location based on the light-projecting direction of the laser light and the like. In other words, when the relative incidence angle of the laser light to the band-pass filter 33 is changed, it is desired to select a suitable photodetector unit 34-$i$ for the laser light-condensing position.

Hence, the present embodiment enables the light-receiving system 3 including the multi-divided photodetector 34 to detect a photodetector signal outputted from the multi-divided photodetector 34 even when the laser light-condensing position shifts because the relative incidence angle of the laser light to the band-pass filter 33 is changed. In this case, the light-receiving system 3 including the multi-divided photodetector 34 designed to receive light using the specific photodetector unit 34-$i$ calculates the amount of shift of the laser light-condensing position resulting from the control of the relative incidence angle of the laser light to the band-pass filter 33, and selects the specific photodetector unit on which the laser light is condensed.

Figure 5:
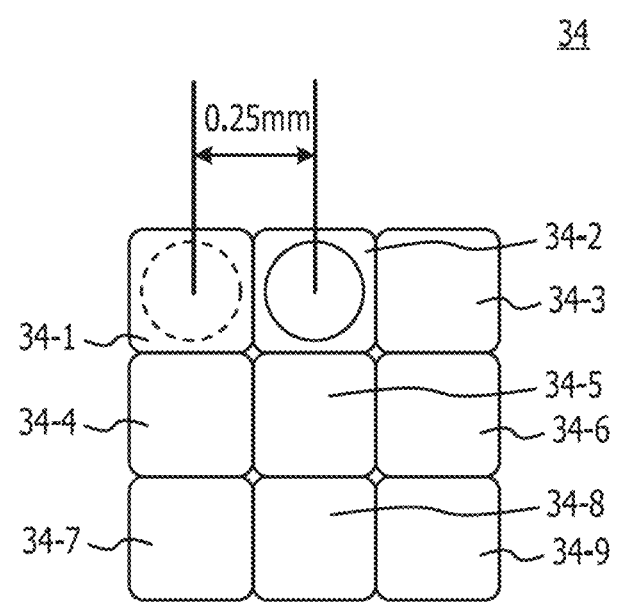
FIG. 5 is a diagram describing an example of an amount of shift on photodetector units of the multi-divided photodetector.

To be specific, the relative incidence angle with respect to the band-pass filter 33 is controlled to adjust the passband center wavelength of the band-pass filter 33 so that the passband center wavelength of the band-pass filter 33 matches the center wavelength of the laser light, which varies with the temperature, emitted from the laser diode 21. The amount of shift y of the laser light-condensing position on the multi-divided photodetector 34 resulting from this adjustment is calculated. A photodetector unit 34-$j$ ($j$=1 to 9) at the position based on the amount of shift y is selectively controlled to be turned on, and thereby the photodetector signal may be detected even when the laser light-condensing position is shifted. Photodetector units that are not controlled nor turned on, or photodetector units that are controlled to be off in other words, output no photodetector signal even though receiving the laser light. For example, when the thickness t of the band-pass filter 33 is 5 mm and the incidence angle of the laser light with respect to the band-pass filter 33 is adjusted from $\theta_1$=0° to $\theta_1$=30°, the amount of shift y is approximately 0.25 mm. In this case, as illustrated in FIG. 5 for example, the laser light is condensed at the incidence angle of $\theta_1$=0° on a specific photodetector unit 34-1 (34-$i$), which is indicated by a circle with a broken line, on the multi-divided photodetector 34. Then, when the incidence angle is adjusted to $\theta_1$=30°, the laser light is condensed on a specific photodetector unit 34-2 (34-$j$), which is indicated by a circle with a solid line, shifted by the amount of shift y of approximately 0.25 mm from the specific photodetector unit 34-1. FIG. 5 is a diagram describing an example of an amount of shift on the photodetector units of the multi-divided photodetector. Since the laser light through the band-pass filter 33 is reliably received by the photodetector unit 34-2 of the multi-divided photodetector 34, the accuracy of the distance measurement is inhibited from being deteriorated.

A direction of the amount of shift y of the laser light-condensing position depends on a direction of the controlled angle of the band-pass filter 33. For example, when the angle at the single axis of the band-pass filter 33 as the center is controlled to be in a positive direction (a clockwise direction in FIG. 2, for example), a direction of the amount of shift y may be a positive direction (a rightward direction in FIG. 5, for example), and when the angle at the single axis of the band-pass filter 33 as the center is controlled to be in a negative direction (a counterclockwise direction in FIG. 2, for example), a direction of the amount of shift y may be a negative direction (a leftward direction in FIG. 5, for example). When the incidence angle of the laser light with respect to the light-receiving system 3 shifts from a designed value, the control system may have a capability of controlling angles at double axes of the band-pass filter 33 as the center to correct the incidence angle to the designed value. In this case, the directions of the amount of shift y may be set to a horizontal direction and a vertical direction in FIG. 5.

Figure 6:
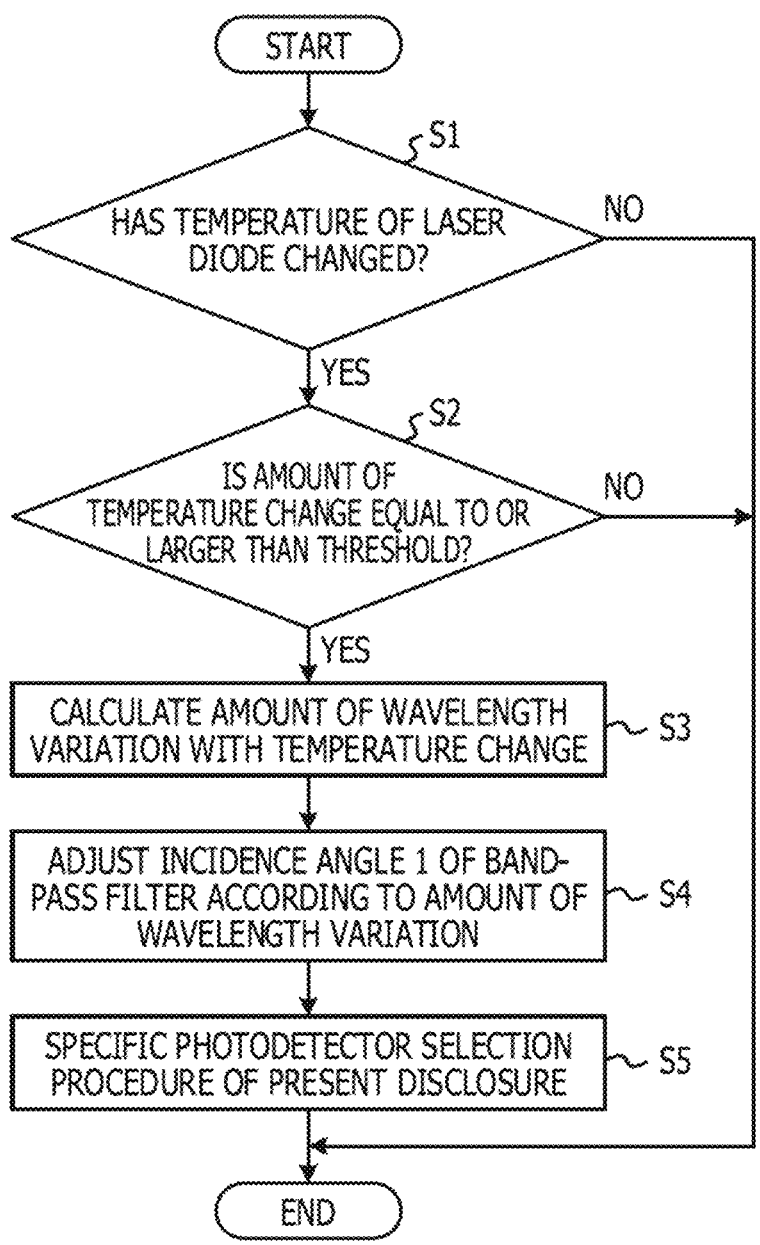
FIG. 6 is a flowchart describing an example of a relative incidence angle control process.

FIG. 6 is a flowchart describing an example of a relative incidence angle control process. The relative incidence angle control process illustrated in FIG. 6 may be executed by, for example, the processing unit 371 illustrated in FIG. 2 executing the program stored in the storing unit 372.

In FIG. 6, the processing unit 371 in step S1 determines whether or not the temperature of the laser diode 21 measured by the thermometer unit 35 has changed. When the determination result is NO, the process ends. When the determination result in step S1 is YES, the processing unit 371 in step S2 determines whether or not an amount of the temperature change is equal to or larger than a threshold. When the determination result is NO, the process ends. When the determination result in step S2 is YES, the processing unit 371 in step S3 calculates how much the wavelength varies with the temperature change. The amount of the wavelength variation with the temperature change may be calculated based on the parameters (for example, the amount of the wavelength variation of the laser diode 21 per unit degrees such as 1° C.) stored in the storing unit 372. In step S4, the processing unit 371 calculates the incidence angle $\theta_1$ for obtaining the passband center wavelength of the band-pass filter 33 corresponding to the calculated amount of the wavelength variation with the temperature change. Then, the processing unit 371 controls the motor 36 so that the laser light with respect to the band-pass filter 33 is adjusted at the calculated incidence angle $\theta_1$. In step S5, the processing unit 371 executes a photodetector unit selection process for selecting the photodetector unit of the multi-divided photodetector 34. Then, the relative incidence angle control process ends.

Figure 7:
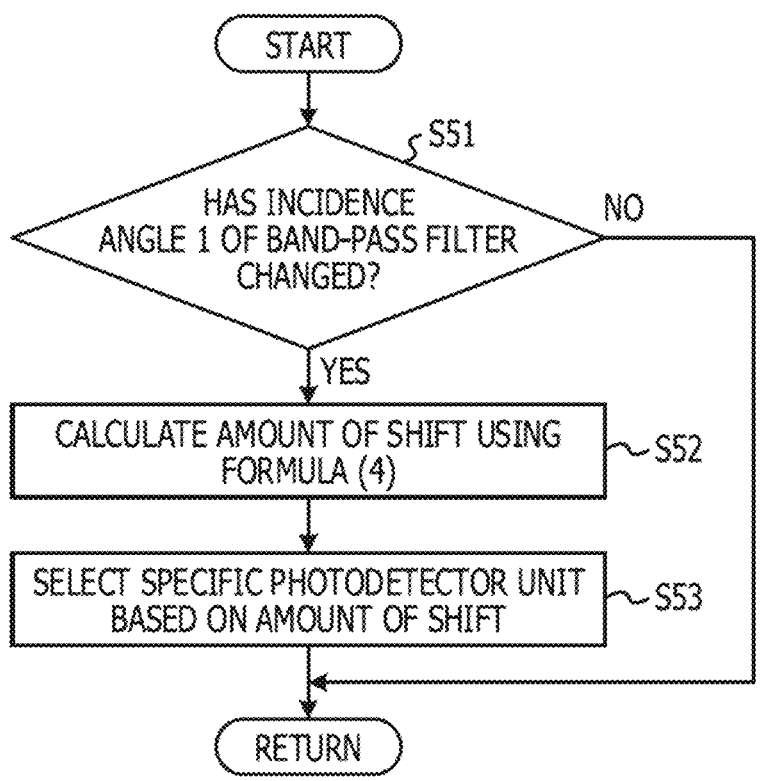
FIG. 7 is a flowchart describing an example of a photodetector unit selection process.

FIG. 7 is a flowchart describing an example of the photodetector unit selection process. The photodetector unit selection process illustrated in FIG. 7 may be executed by, for example, the processing unit 371 illustrated in FIG. 2 executing the program stored in the storing unit 372.

In FIG. 7, the processing unit 371 in step S51 determines whether or not the incidence angle $\theta_1$ of the laser light with respect to the band-pass filter 33 has changed. When the determination result is NO, the process returns to the relative incidence angle control process in FIG. 6 and the relative incidence angle control process ends. Whether or not the incidence angle $\theta_1$ changes may be detected by, for example, a signal used by the processing unit 371 to control the stepping motor 36. When the determination result in step S51 is YES, the processing unit 371 in step S52 calculates the amount of shift y represented using the above formula (4). In step S53, the processing unit 371 selectively controls to turn on the photodetector unit 34-2 (34-$j$) on which the laser light is condensed based on the calculated amount of shift y. Then, the process returns to the relative incidence angle control process in FIG. 6 and the relative incidence angle control process ends. Consequently, in step S5 in FIG. 6, the photodetector signal for calculating the distance to the measurement object 100 is outputted from the photodetector unit of the multi-divided photodetector 34 controlled to be turned on.

Measurement process may be executed by the processing unit 371 illustrated in FIG. 2 executing the measurement program stored in the storing unit 372, for example. The measurement process allows the processing unit 371 to detect the photodetector signal of the photodetector unit of the multi-divided photodetector 34 controlled to be turned on in addition to the relative incidence angle control process illustrated in FIG. 6. Hence, the measurement process is capable of calculating the distance between the measurement object 100 and the laser distance measurement apparatus 1-1 based on the detected photodetector signal using a publicly known method. As a later-described second embodiment for example, the distance may be calculated by a measurement circuit connected to an output of the multi-divided photodetector 34.

As described above, even when the center wavelength of the laser light emitted from the laser diode 21 varies with the temperature, the passband center wavelength of the band-pass filter 33 may be adjusted so that the passband center wavelength of the band-pass filter 33 matches the center wavelength of the laser light by changing the relative incidence angle of the laser light to the band-pass filter 33. In addition, in the light-receiving system 3 including the multi-divided photodetector 34 designed to receive the laser light using the specific photodetector unit (or specific photodetector area), the amount of shift of the laser light-condensing position resulting from the control of the angle of the band-pass filter 33 is calculated, and the specific photodetector unit (or specific photodetector area) on which the laser light is condensed is selectively controlled to be turned on. Even when the optical path of the laser light reaching the multi-divided photodetector 34 through the band-pass filter 33 shifts because of the change of the relative incidence angle of the laser light to the band-pass filter 33, the accuracy of the distance measurement is inhibited from being deteriorated by detecting the photodetector signal by performing control to selectively turn on the photodetector unit (or photodetector area) at the position at which the laser light is condensed through the band-pass filter 33.

Second Embodiment

Figure 8:
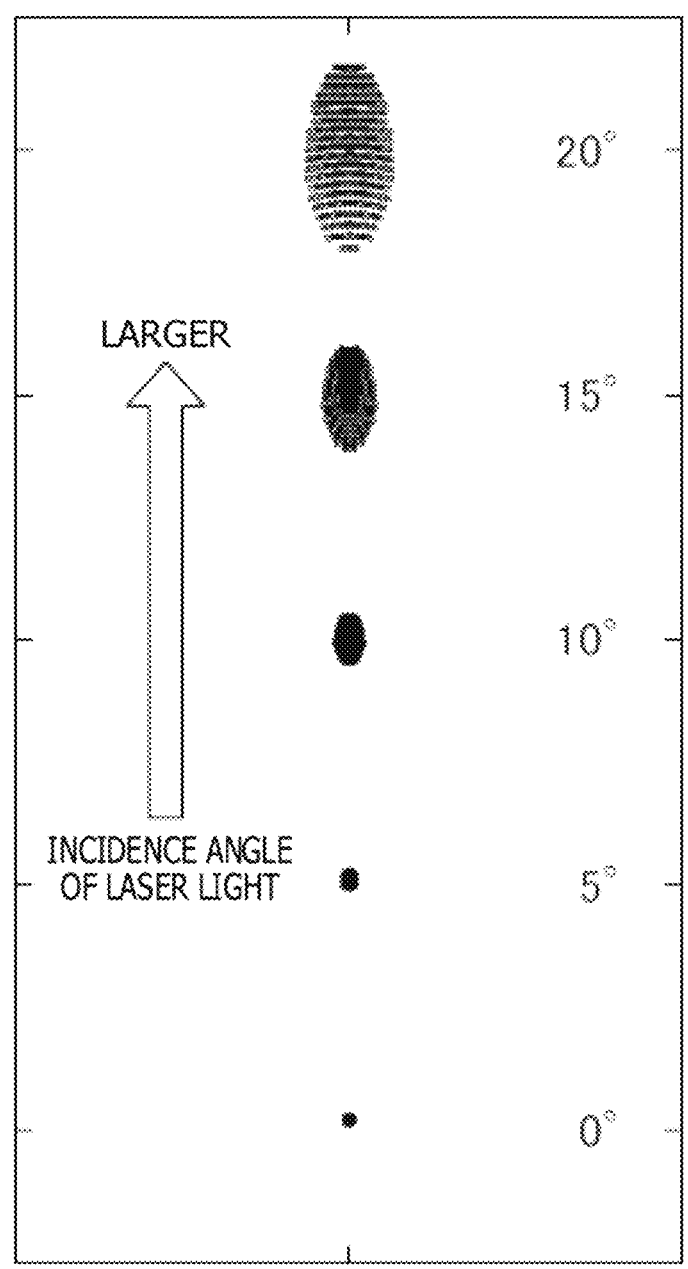
FIG. 8 is a diagram describing an example of incidence spots of the laser light condensed on the multi-divided photodetector.

Next, a laser distance measurement apparatus according to the second embodiment is described. A multi-divided photodetector formed of multiple photodetectors is capable of suppressing the ambient light to be received by selectively controlling and turning on a photodetector suitable to the light-projecting direction. However, when using a light-receiving system provided with a light-receiving lens for receiving light from a wide angle (that is, a wide-angle lens), a size of an incidence spot of the laser light condensed on the multi-divided photodetector changes according to the incidence angle of the laser light with respect to the light-receiving system as illustrated in FIG. 8. Thus, it is desirable that one or more photodetectors be selectively controlled to be turned on according to the size of the incidence spot. FIG. 8 is a diagram describing an example of the incidence spots of the laser light condensed on the multi-divided photodetector. In FIG. 8, each of angles 0° to 20° illustrated on the right side of the incidence spot indicates the incidence angle of the laser light with respect to the light-receiving system. As illustrated in FIG. 8, the incidence spot gets larger as the incidence angle of the laser light with respect to the light-receiving system gets larger.

In this case, if the multiple photodetectors are selectively controlled to be turned on to fit the case where the incidence angle of the laser light is 0° and the incidence spot is small, a receivable amount of light decreases when the incidence angle is 20° and the incidence spot is large. This reduces intensity of the photodetector signal. On the contrary, if the multiple photodetectors are selectively controlled to be turned on to fit the case where the incidence angle of the laser light is 20° and the incidence spot is large, an amount of the ambient light to be received increases when the incidence angle is 0° and the incidence spot is small. This increases the noise. To address this problem, the present embodiment makes it possible to variably set the photodetectors selectively controlled to be turned on and the number of the photodetectors according to the size (or breadth) of the incidence spot of the laser light.

Figure 9:
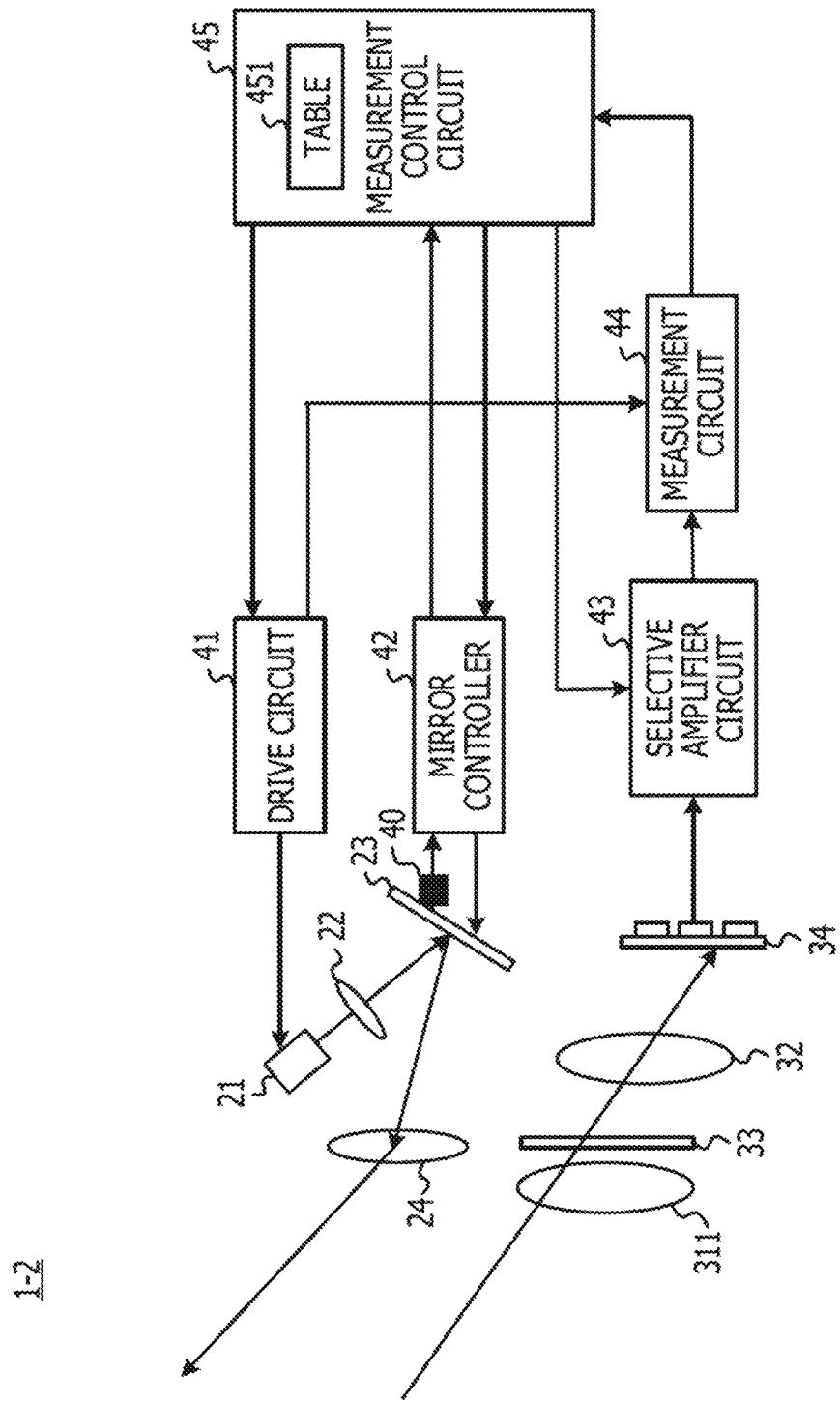
FIG. 9 is a diagram schematically illustrating an example of a laser distance measurement apparatus according to a second embodiment.

FIG. 9 is a diagram schematically illustrating an example of the laser distance measurement apparatus according to the second embodiment. In FIG. 9, the same parts as those in FIG. 1 are assigned the same reference signs and descriptions thereof are omitted. As illustrated in FIG. 9, a laser distance measurement apparatus 1-2 includes a detector 40 for detecting the angle of the mirror 23, a drive circuit 41 for driving the laser diode 21, a mirror controller 42 for controlling the mirror 23, a selective amplifier circuit 43 for selectively amplifying the photodetector signal outputted from the multi-divided photodetector 34, a measurement circuit 44 for calculating the distance to the measurement object based on the selectively amplified photodetector signal, and a measurement control circuit 45. The mirror 23 may be a micro electro mechanical system (MEMS) mirror, for example. Since the configuration and operation of the control system of the band-pass filter 33 may be the same as those in FIG. 2, the control system of the band-pass filter 33 is not illustrated in FIG. 9. In this example, the band-pass filter 33 is provided between a light-receiving lens 311 and the condenser lens 32 as a preceding stage of the condenser lens 32. In addition, in this example, the wide-angle lens is used as the light-receiving lens 311.

The detector 40 detects a vertical angle V and a horizontal angle H of the mirror 23, which decide the light-projecting direction of the laser light, using a publicly known method. Then, the detector 40 feeds the detected mirror angles to the measurement control circuit 45 via the mirror controller 42. The measurement control circuit 45 includes a table 451. The table 451 stores information depending on the mirror angles and indicating whether each of the multiple photodetector units of the multi-divided photodetector 34 corresponds to the incidence spot, and is to be selectively controlled and turned on. The measurement control circuit 45 refers to the information in the table 451 based on the mirror angles detected by the detector 40. Thereby, the measurement control circuit 45 feeds a selection signal, which is an example of information indicating a photodetector unit outputting the photodetector signal to be selectively amplified, to the selective amplifier circuit 43. The selective amplifier circuit 43 amplifies the photodetector signal outputted from the photodetector unit that is indicated by the selection signal of the multi-divided photodetector 34 and feeds the amplified photodetector signal to the measurement circuit 44. When the selection signal indicates multiple photodetector units, the selective amplifier circuit 43 amplifies a sum of the photodetector signals outputted from the multiple photodetector units and feeds the amplified result to the measurement circuit 44.

Instead of feeding the selection signal, which indicates the photodetector unit outputting the photodetector signal to be selectively amplified, to the selective amplifier circuit 43, the measurement control circuit 45 may directly feed the selection signal indicating the photodetector unit controlled to be turned on to the multi-divided photodetector 34. In this case, power consumption of the multi-divided photodetector 34 may be reduced, and the selective amplifier circuit 43 may amplify the photodetector signal outputted from the photodetector unit controlled to be turned on or the sum of the photodetector signals outputted from the multiple photodetector units controlled to be turned on. In addition, in this case, at least part of the process of the measurement control circuit 45 may be executed by the controller 37 in the control system of the band-pass filter 33.

The measurement control circuit 45 controls the drive circuit 41 to drive the laser diode 21 with a publicly know method such as, for example, pulse driving. The drive circuit 41 feeds a signal indicating a timing of driving the laser diode 21 to the measurement circuit 44. Thus, the measurement circuit 44 may calculate the distance to the measurement object at every scanning of the projected laser light.

Note that the process of the measurement circuit 44 may be executed by the controller 37 in the control system of the band-pass filter 33.

Figure 10:
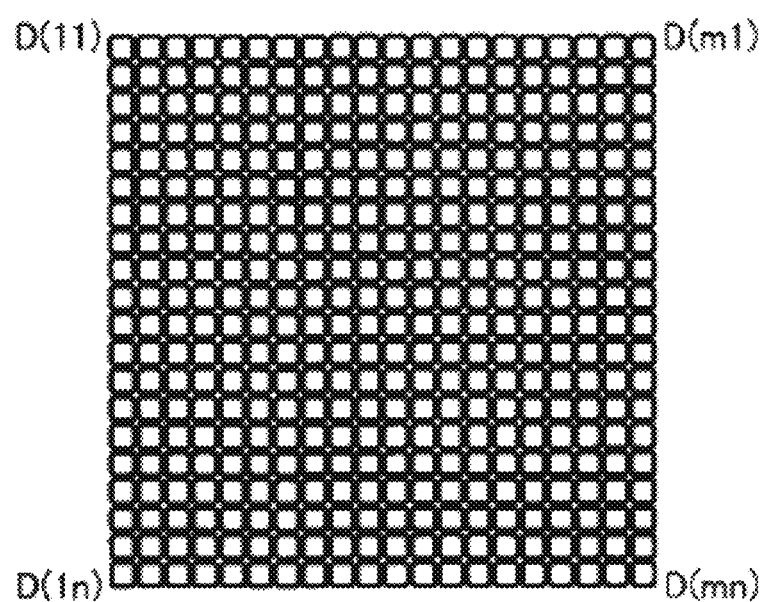
FIG. 10 is a diagram illustrating an example of positions of photodetector channels of the multi-divided photodetector.

FIG. 10 is a diagram illustrating an example of positions of photodetector channels of the multi-divided photodetector. The multi-divided photodetector 34 illustrated in FIG. 10 includes photodetector units D(11) to D(mn) arranged in a matrix of n rows and m columns. Here, n and m are both natural numbers of 2 or greater and may either be equal to or not equal to each other. In this example, each position of the photodetector units forming the multi-divided photodetector 34 corresponds to the position of one photodetector channel.

FIG. 11 is a diagram illustrating an example of the table storing photodetector channels depending on the light-projecting direction. The table 451 is stored in a memory and the like in the measurement control circuit 45 in the example illustrated in FIG. 9, but may be stored in a memory externally connected to the measurement control circuit 45. As illustrated in FIG. 11, the table 451 stores the selection signals (or selection information) of the photodetector channels D(11) . . . D(mn) with respect to the vertical angle V and the horizontal angle H which define the light-projecting direction of the laser light. For convenience of description in FIG. 11, of the multi-divided photodetector 34, each photodetector unit corresponding to the incidence spot and being controlled to be turned on is represented by a selection signal of "1" and each photodetector unit not corresponding to the incidence spot and being controlled to be kept off is represented by a selection signal of "0."

Figure 12:
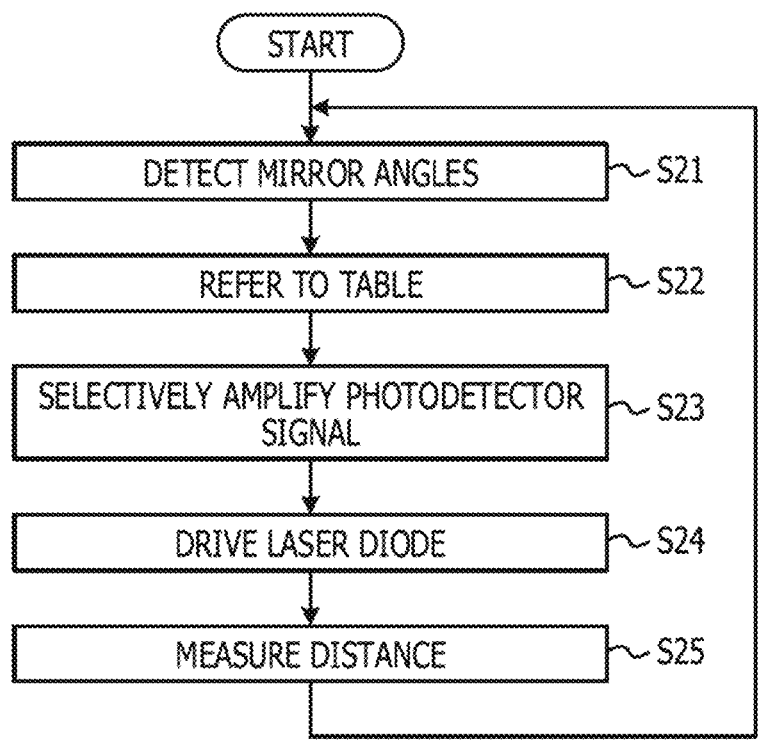
FIG. 12 is a flowchart describing an example of photodetector variably setting process.

FIG. 12 is a flowchart describing an example of photodetector variably setting process. The process of the measurement control circuit 45 may be executed by, for example, a processor executing the measurement program. In FIG. 12, the measurement control circuit 45 in step S21 obtains the vertical angle V and the horizontal angle H, or the mirror angles, of the mirror 23 detected by the detector 40, in other words. In step S22, the measurement control circuit 45 refers to the table 451 based on the obtained mirror angles and then obtains the selection signal indicating the photodetector unit outputting the photodetector signal to be selectively amplified. In step S23, the measurement control circuit 45 feeds the obtained selection signal to the selective amplifier circuit 43. Then, the selective amplifier circuit 43 amplifies the photodetector signal outputted from the photodetector unit that is indicated by the selection signal of the multi-divided photodetector 34 and feeds the amplified photodetector signal to the measurement circuit 44. Note that, when the selection signal indicates multiple photodetector units, the selective amplifier circuit 43 amplifies the sum of the photodetector signals outputted from the multiple photodetector units and feeds the amplified result to the measurement circuit 44. In step S24, the measurement control circuit 45 controls the drive circuit 41 to drive the laser diode 21. In step S25, the measurement control circuit 45 obtains the distance to the measurement object calculated by the measurement circuit 44 at every scanning of the projected laser light, and the process returns to step S21. The distance to the measurement object obtained by the measurement control circuit 45 may be outputted to, for example, an external apparatus.

In addition to the advantageous effects obtained in the first embodiment described above, the present embodiment suppresses decline of signal intensity of the photodetector signal outputted from the multi-divided photodetector regardless of the size of the incidence spot of the laser light condensed on the multi-divided photodetector and thereby achieves suppression of the noise.

Third Embodiment

Figure 13:
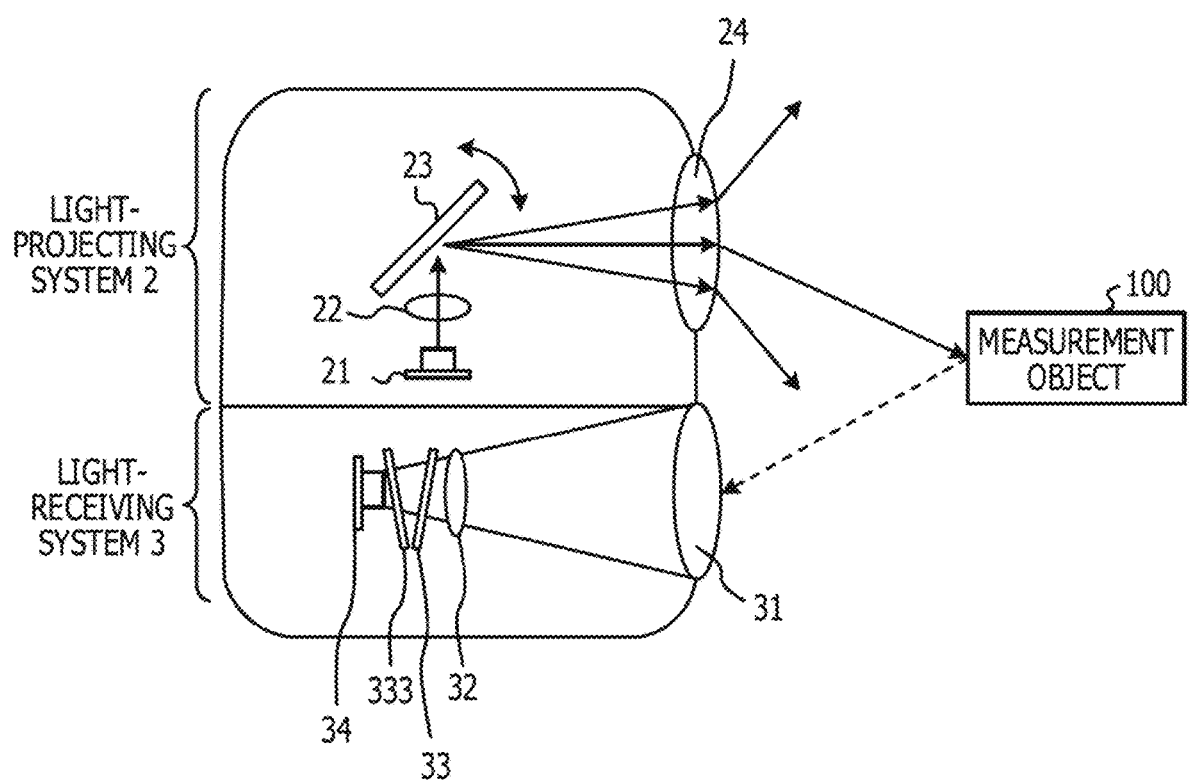
FIG. 13 is a diagram schematically illustrating an example of a laser distance measurement apparatus according to a third embodiment.
Figure 14:
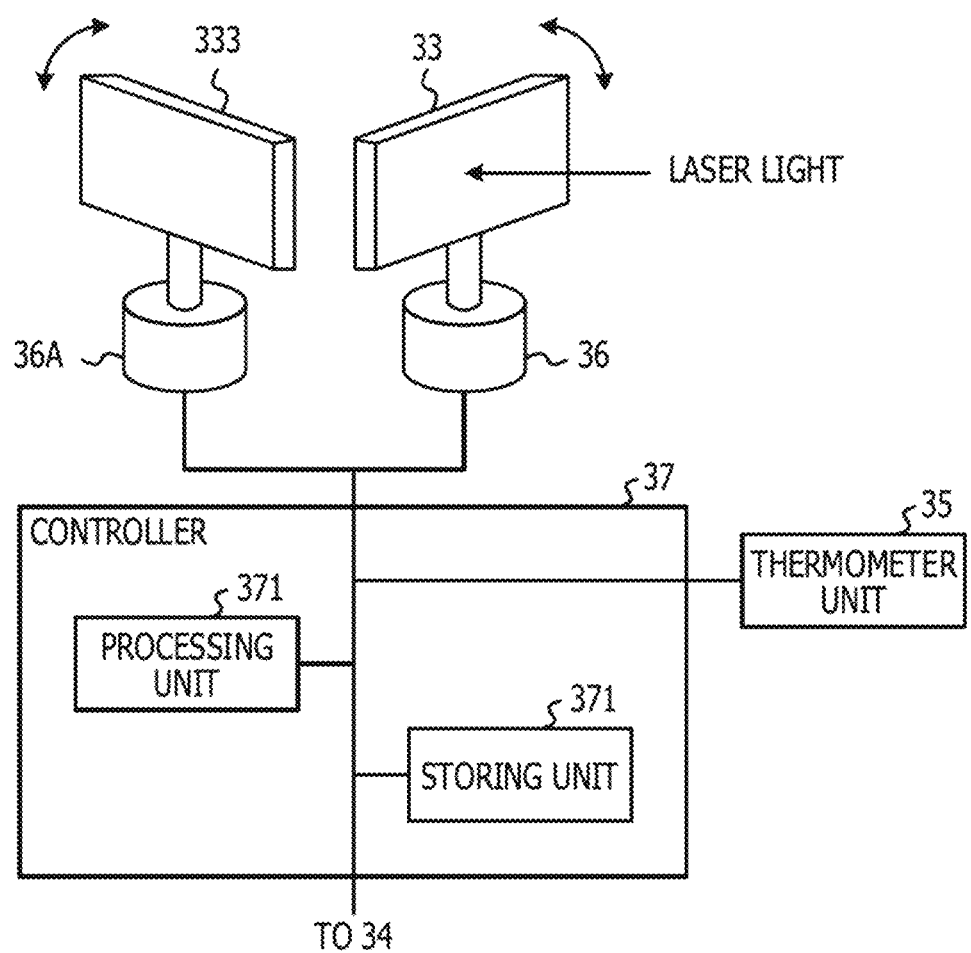
FIG. 14 is a diagram illustrating another example of the control system of the band-pass filter.

Next, a laser distance measurement apparatus according to a third embodiment is described. FIG. 13 is a diagram schematically illustrating an example of the laser distance measurement apparatus according to the third embodiment, and FIG. 14 is a diagram illustrating another example of the control system of the band-pass filter. In FIGS. 13 and 14, the same parts as those FIGS. 1 and 2 are assigned the same reference signs and descriptions thereof are omitted. As illustrated in FIGS. 13 and 14, a laser distance measurement apparatus 1-3 is provided with a light-condensing position correcting plate 333 for correcting the shift of the optical path of the laser light resulted from the control of the angle of the band-pass filter 33, in other words, the shift of the laser light-condensing position on the multi-divided photodetector 34. The light-condensing position correcting plate 333 is an example of a correcting plate and is arranged in an optical path between the band-pass filter 33 and the multi-divided photodetector 34 which are along the optical path of receiving the laser light reflected from the measurement object 100. The control system of the band-pass filter 33 includes a motor 36A for light-condensing position correcting plate for controlling an angle of the light-condensing position correcting plate 333 in the same way as the motor 36 for the band-pass filter controls the angle of the band-pass filter 33.

As illustrated in FIG. 13, the light-receiving system 3 is provided with the multi-divided photodetector 34 designed to receive the laser light reflected from the measurement object 100 using the specific photodetector unit according to the light-projecting direction of the laser light. In the light-receiving system 3, the relative incidence angle of the laser light to the band-pass filter 33 with reference to FIG. 14 is controlled to make an adjustment such that the passband center wavelength of the band-pass filter 33 matches the center wavelength of the laser light, which varies with the temperature. In this case, the optical path of the laser light shifts because of the change of the relative incidence angle of the laser light to the band-pass filter 33. This causes the shift of the laser light-condensing position on the multi-divided photodetector 34. To address this problem, the present embodiment calculates the amount of shift of the laser light-condensing position on the multi-divided photodetector 34 and controls the angle of the light-condensing position correcting plate 333 for restoring the shifted laser light-condensing position to the laser light-condensing position before the shift occurs.

The angle of the light-condensing position correcting plate 333 is controlled to cancel the shift of the optical path of the laser light resulted from the control of the angle of the band-pass filter 33. This makes it possible to inhibit the shift of the laser light-condensing position on the multi-divided photodetector 34 even when controlling the angle of the band-pass filter 33. Hence, since the laser light is reliably condensed on the photodetector unit of the multi-divided photodetector 34 controlled to be turned on, the present embodiment suppresses the decline of the signal intensity of the photodetector signal outputted from the photodetector unit and thereby achieves the suppression of the noise.

As for the light-condensing position correcting plate 333, a correcting plate formed of a material having the same refractive index and thickness as those of a base material forming the band-pass filter 33 may be used. When forming the light-condensing position correcting plate 333 using such a material having the same refractive index and thickness as those of the base material forming the band-pass filter 33, the shift of the optical path of the laser light resulted from the control of the angle of the band-pass filter 33 may be canceled by controlling the light-condensing position correcting plate 333 to be at an angle complemented to the angle of the band-pass filter 33.

Figure 15:
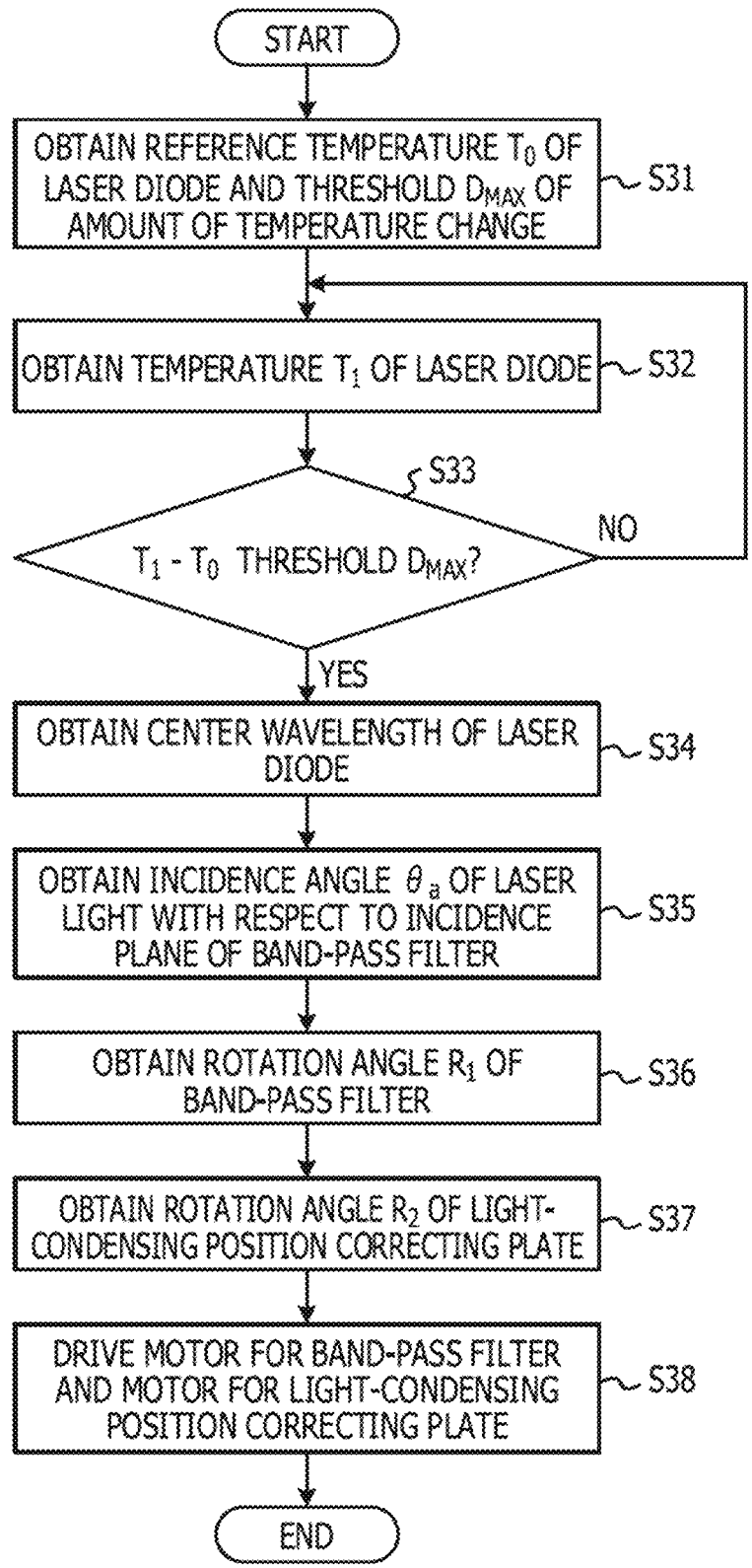
FIG. 15 is a flowchart describing an example of rotation angle control process of the band-pass filter and a light-condensing position correcting plate.

FIG. 15 is a flowchart describing an example of rotation angle control process of the band-pass filter and the light-condensing position correcting plate. The rotation angle control process illustrated in FIG. 15 may be executed by the processing unit 371 executing the program stored in the storing unit 372 illustrated in, for example, FIG. 14.

In FIG. 15, the processing unit 371 in step S31 reads out and obtains a reference temperature $T_0$ of the laser diode 21 and a threshold $D_{MAX}$ of the amount of the temperature change from the storing unit 372. In step S32, the processing unit 371 obtains a temperature $T_1$ of the laser diode 21 measured by the thermometer unit 35. In step S33, with regard to the temperature $T_1$ of the laser diode and the reference temperature $T_0$ of the laser diode, the processing unit 371 determines whether or not a difference $T_1-T_0$ is equal to or larger than the threshold $D_{MAX}$. When the determination result is NO, the process returns to step S32. When the determination result is YES, the process proceeds to step S34.

In step S34, the processing unit 371 reads out and obtains the center wavelength of the laser light emitted from the laser diode 21 at the temperature $T_1$ from the storing unit 372. In step S35, the processing unit 371 obtains an incidence angle $\theta_a$ of the laser light with respect to the incidence plane of the band-pass filter 33 in the case of matching the passband center wavelength of the band-pass filter 33 with the center wavelength of the laser light emitted from the laser diode 21. The amount of the wavelength variation with the temperature change may be calculated based on the parameters (for example, the amount of the wavelength variation of the laser diode 21 per unit degrees such as 1° C.) stored in the storing unit 372. In step S35, the processing unit 371 calculates the incidence angle $\theta_a$ for obtaining the passband center wavelength of the band-pass filter 33 according to the calculated amount of the wavelength variation with the temperature change. In step S36, the processing unit 371 calculates and obtains a rotation angle R1 of the band-pass filter 33 for obtaining the incidence angle $\theta_a$. In step S37, the processing unit 371 calculates and obtains a rotation angle R2 of the light-condensing position correcting plate 333 for cancelling the shift of the optical path of the laser light resulted from the band-pass filter 33 rotating by the rotation angle R1. In step S38, the processing unit 371 drives the motor 36 to perform control of setting the band-pass filter 33 at the rotation angle R1 and drives the motor 36A to perform control of setting the light-condensing position correcting plate 333 at the rotation angle R2. Then, the process ends.

Also in the present embodiment, as with the second embodiment described above, the photodetector selectively controlled to be turned on may be variably set according to the size (or breadth) of the incidence spot of the laser light.

According to the present embodiment, by providing the light-condensing position correcting plate 333, the shift of the laser light-condensing position on the multi-divided photodetector 34 resulted from the control of the angle of the band-pass filter 33 is inhibited, and the same advantageous effect as that obtained in the first embodiment described above may be obtained.

According to the embodiments described above, the passband center wavelength of the band-pass filter may be adjusted by changing the incidence angle of the laser light with respect to the band-pass filter. In addition, because of the change of the incidence angle of the laser light with respect to the band-pass filter, the photodetector signal may be detected by selecting the photodetector unit at the position at which the laser light is condensed through the band-pass filter even when the optical path of the laser light reaching the multi-divided photodetector through the band-pass filter shifts. This inhibits the accuracy of the distance measurement from being deteriorated. In other words, in the light-receiving system provided with the multi-divided photodetector designed to receive light using the specific photodetector unit, the amount of the shift of the laser light-condensing position resulted from the control of the angle of the band-pass filter is calculated, and the photodetector unit at the laser light-condensing position is controlled to be turned on by taking into account the amount of the shift. To be specific, the first and second embodiments described above control and turn on the photodetector unit at the position based on the amount of the shift. The third embodiment described above controls and turns on the photodetector unit at the laser light-condensing position by correcting the amount of the shift using the light-condensing position correcting plate. The photodetector unit at the laser light-condensing position controlled to be turned on may be at least one photodetector unit and may also be multiple photodetector units.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for laser distance measurement, the apparatus comprising:
    a light-projecting circuit configured to project laser light emitted from a laser diode;
    a filter configured to transmit light of a specific wavelength region and suppress light of a wavelength region other than the specific wavelength region;
    a photodetector including a plurality of photodetector elements, and configured to receive the laser light, which is projected from the light-projecting circuit and reflected from a measurement object, through the filter;
    a wide-angle lens configured to receive the reflected laser light; and
    a controller configured to
        control a relative incidence angle of the reflected laser light with respect to the filter,
        selectively control and turn on at least one of the plurality of photodetector elements based in part on a shift of a light-condensing position according to the relative incidence angle and an incidence spot on the photodetector, the incidence spot being distorted depending on an incident angle of the reflected laser light with respect to the wide-angle lens, and
        cause a photodetector signal, which is to be used for calculating a distance to the measurement object, to be outputted from the at least one of the plurality of photodetector elements turned on.

2. The apparatus according to claim 1, the apparatus further comprising:
    a thermometer circuit configured to measure a temperature of the laser diode,
    wherein the controller is configured to, when a change in the temperature measured is equal to or larger than a threshold, calculate an amount of a center wavelength variation with the change in the temperature and control the relative incidence angle based in part on the amount of the center wavelength variation.

3. The apparatus according to claim 1,
wherein the controller is configured to, when the relative incidence angle is changed, calculate the shift and selectively control and turn on at least one of the plurality of photodetector elements based in part on a position corresponding to the shift.

4. The apparatus according to claim 1, the apparatus further comprising:
a table configured to store information indicating whether or not each of the photodetector elements corresponds to the incidence spot and is to be selectively controlled to be turned on, depending on a light-projecting direction of the laser light projected from the light-projecting circuit,
wherein the controller is configured to specify at least one of the plurality of photodetector elements to be selectively controlled to be turned on by referring to the information in the table based in part on the light-projecting direction and selectively control and turn on the specified photodetector element out of the plurality of photodetector elements.

5. The apparatus according to claim 1, the apparatus further comprising:
a correcting plate formed of a material having the same refractive index and thickness as those of a base material forming the filter, and arranged in an optical path between the filter and the photodetector,
wherein the controller is configured to control an angle of the correcting plate so as to correct the shift of the light-condensing position of the reflected laser light from the light-condensing position before the control.

6. A method for laser distance measurement, the method comprising:
projecting laser light emitted from a laser diode by a light-projecting circuit;
receiving the laser light projected and reflected from a measurement object, by a photodetector including a plurality of photodetector elements through a filter, the filter being configured to transmit light of a specific wavelength region and suppress light of a wavelength region other than the specific wavelength region;
receiving the reflected laser light by a wide-angle lens;
controlling a relative incidence angle of the reflected laser light with respect to the filter by a controller;
selectively controlling and turning on at least one of the plurality of photodetector elements by the controller based in part on the shift of the light-condensing position according to the relative incidence angle and an incidence spot on the photodetector, the incidence spot being distorted depending on an incident angle of the reflected laser light with respect to the wide-angle lens; and
outputting a photodetector signal to be used for calculating a distance to the measurement object, from the at least one of the plurality of photodetector elements turned on.

7. The method according to claim 6, the method further comprising:
measuring a temperature of the laser diode by a thermometer circuit,
wherein the controlling of the relative incidence angle includes, when a change in the temperature measured is equal to or larger than a threshold, calculating an amount of a center wavelength variation with the change in the temperature and controlling the relative incidence angle based in part on the amount of the center wavelength variation by the controller.

8. The method according to claim 6,
wherein the outputting of the photodetector signal includes, when the relative incidence angle is changed, calculating the shift and selectively controlling and turning on at least one of the plurality of photodetector elements by the controller based in part on the position to which the shift occurs.

9. The method according to claim 6,
wherein the outputting of the photodetector signal includes
specifying at least one of the plurality of photodetector elements to be selectively controlled to be turned on by the controller by referring to a table based in part on a light-projecting direction of the laser light projected from the light-projecting unit, the table storing information indicating whether or not each of the photodetector elements corresponds to the incidence spot and is to be selectively controlled to be turned on, depending on the light-projecting direction, and
selectively controlling and turning on at least one of the specified photodetector element out of the plurality of photodetector elements.

10. The method according to claim 6, the method further comprising:
controlling an angle of a correcting plate by the controller so as to correct the shift of the light-condensing position of the reflected laser light from the light-condensing position before the control, the correcting plate formed of a material having the same refractive index and thickness as those of a base material forming the filter, and arranged in an optical path between the filter and the photodetector.

11. A non-transitory computer-readable storage medium storing a program that causes a processor to execute a process, the process comprising:
driving a laser diode of a light-projecting circuit to project laser light emitted from the laser diode;
controlling a relative incidence angle of the laser light projected from the light-projecting circuit and reflected from a measurement object, with respect to a filter, the filter being configured to transmit light of a specific wavelength region and suppress light of a wavelength region other than the specific wavelength region;
selectively controlling and turning on at least one of a plurality of photodetector elements based in part on a shift of a light-condensing position according to the relative incidence angle and an incidence spot on the photodetector, the incidence spot being distorted according to an incident angle of the reflected laser light with respect to a wide-angle lens; and
outputting a photodetector signal to be used for calculating a distance to the measurement object, from the at least one of the plurality of photodetector elements turned on.

12. The storage medium according to claim 11,
wherein the controlling of the relative incidence angle includes
obtaining a temperature of the laser diode measured by a thermometer circuit,
calculating an amount of a center wavelength variation with a change in the temperature when the change in the temperature measured is equal to or larger than a threshold, and
controlling the relative incidence angle based in part on the amount of the center wavelength variation.

13. The storage medium according to claim 11,
wherein the outputting of the photodetector signal includes
calculating the shift when the relative incidence angle is changed, and
selectively controlling and turning on at least one of the plurality of photodetector elements based in part on the position corresponding to the shift.

14. The storage medium according to claim 11,
wherein the outputting of the photodetector signal includes
specifying at least one of the plurality of photodetector elements to be selectively controlled to be turned on by referring to a table based in part on a light-projecting direction of the laser light projected from the light-projecting circuit, the table storing information indicating whether or not each of the photodetector elements corresponds to the incidence spot and is to be selectively controlled to be turned on, depending on the light-projecting direction, and
selectively controlling and turning on the specified photodetector element out of the plurality of photodetector elements.

15. The storage medium according to claim 11, the process further comprising
controlling an angle of a correcting plate, which is formed of a material having the same refractive index and thickness as those of a base material forming the filter and is arranged in an optical path between the filter and the photodetector, so as to correct the shift of the light-condensing position of the reflected laser light from the light-condensing position before the control.

* * * * *